UNITED STATES PATENT OFFICE.

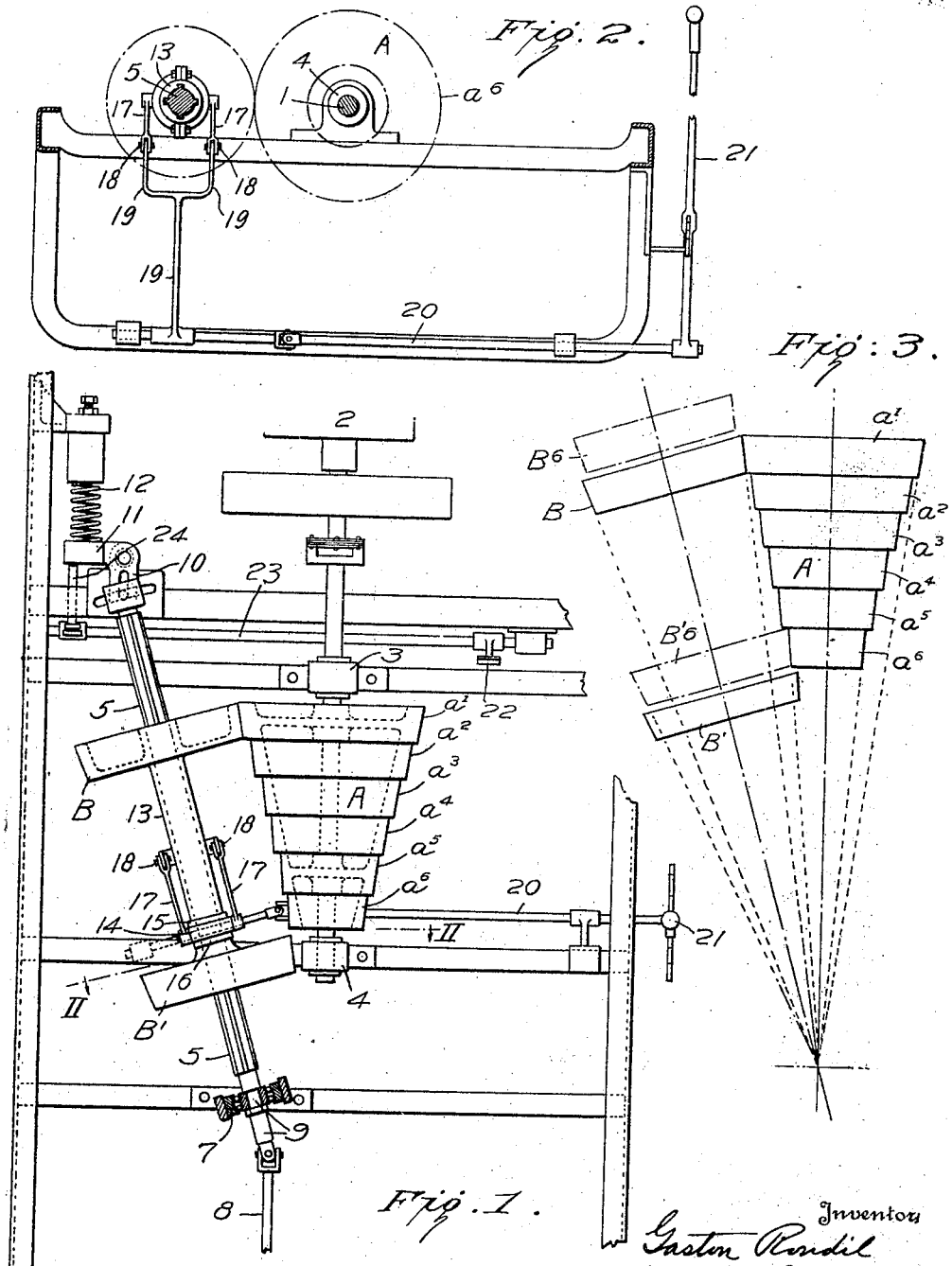

GASTON ROUDIL, OF ST.-OUEN, AND MARC DURAND, OF PARIS, FRANCE.

FRICTION-ROLL TRANSMISSION AND CHANGE-GEARING.

1,382,244.  Specification of Letters Patent.  Patented June 21, 1921.

Application filed June 4, 1919. Serial No. 301,834.

*To all whom it may concern:*

Be it known that we, GASTON ROUDIL and MARC DURAND, citizens of the Republic of France, residing at, respectively, 34 Avenue des Batignolles, St.-Ouen, Seine, and 2<sup>bis</sup> Rue d'Annam, Paris, have invented certain new and useful Improvements in the Friction-Roll Transmissions and Change-Gearings, of which the following is a specification.

This invention relates to power transmission and speed changing by means of cone-shaped friction members, and its object is to suppress excessive friction and slipping of the parts, which usually occur in such members by reason of the difference in the distances covered by the corresponding parallel portions of the friction cone and the roller.

Speed-changing devices are already in use which comprise a stepped pulley with multiple steps having coöperating therewith a roller slidable along its shaft in such manner as to come in contact with any one of the steps of the said pulley.

In order that the roller shall properly engage the step under consideration, the cone of the roller and the cone of the said step must have a common point represented by the intersection of the two axes. But admitting that this condition is realized for the roller and one of the steps, which will be hereinafter denominated "correct cone-shaped step," this condition no longer holds good when the roller engages another step, for, since the roller cannot change its shape, the apex of its cone must necessarily be displaced along the axis by the same amount as the roller itself, and the outer profile of the roller will be no longer parallel to the outer profile of each of the other steps, but these two profiles will form an angle, this angle being greater as the step under consideration is located farther from "the correct cone-shaped step." The mechanical efficiency of the power transmission is satisfactory when the profiles of the roller and of the step are in exact concordance, that is, having the correct cone-shape; the efficiency is fairly good when the angle between these profiles has a very small value, but it becomes very low under conditions in which the roller is obliged to work upon the entire series of different stages of a stepped pulley.

The present invention consists in the use of a plurality of rollers each of which is adapted to work with a group or a portion only of the steps of a pulley, and disposed in such manner that only one of them can engage the pulley when in a given position.

In the accompanying drawing which shows by way of example an embodiment of the invention as applied to a motor vehicle, Figure 1 is a plan view;

Fig. 2 is an end view along the line 11—11 (Fig. 1), and

Fig. 3 is a diagram explaining the operation of the device.

The longitudinal shaft 1, operated by the motor 2 and journaled in the bearings 3 and 4 attached to the vehicle frame, carries a stepped pulley A with multiple steps $a^1$, $a^2$, $a^3$, $a^4$, $a^5$ and $a^6$. Two rollers B, B' are mounted upon a countershaft 5 in such manner as to participate in the rotation thereof, but are slidable along this shaft. The shaft 5 is journaled in the bearings 6, 7, and communicates the motion received from the rollers to the wheel-operating gear, by means of a universal joint shaft 8. The bearing 7 is disposed so as to pivot upon the vertical pin 9 with reference to the vehicle frame, and the bearing 6 located at the other end of the shaft 5 is mounted upon a right-angled lever adapted to rotate about a vertical shaft. A compression spring 12 tends to move the right-angled lever in such manner as to cause the shaft 5 to approach the shaft 1 by a movement about the pivot 9, and to apply one of the rollers of the shaft 5 against the stepped pulley.

In the example here represented, the rollers B, B' are permanently attached together, being mounted upon a common sleeve 13 slidable upon the shaft 5.

A collar 14 is disposed between the shoulders 15 and 16 of the sleeve 13 and this collar 14 is movable along the axis of the shaft by means of a forked arm 19 having articulated thereon at 18 the straps 17, this arm being operated by means of the shaft 20 by a change-speed lever 21. An uncoupling lever or pedal 22 is provided for rocking the shaft 23 and for driving a catch piece against the arm 11 of the right-angled lever 10—11 in order to turn the latter against the action of the spring 12 and to separate the shaft 5 from the shaft 1 by a movement of rotation about the pivot 9 in order to effect the uncoupling action.

For changing the speed, all that is required is to uncouple by pushing upon the pedal 22, and to throw the change-speed lever 21 in order to bring any one of the rollers B, B', in contact with the desired step of the pulley. The roller B, or high-speed roller, is designed to coöperate with only a portion of the steps, to wit, with the group $a^1$, $a^2$, $a^3$ of the pulley, while B' or the slow-speed roller is designed to coöperate with another group, to wit, $a^6$, $a^5$, $a^4$. One of the steps of the first-mentioned group, for instance $a^1$, has the "correct cone-shape" in order to coincide exactly when B shall engage therewith. In the same manner, one of the steps of the second group, for instance $a^6$, also has the "correct cone-shape" in order to coincide exactly with B' when the latter shall engage therewith. It will be observed that when the roller B is brought against $a^2$, and subsequently with $a^3$, the condition of "correct cone-shape" will no longer hold good, but the angle formed by the two profiles will still be quite small. The same will be true when B' comes in contact with $a^5$ or $a^4$. The use of two rollers instead of a single one will therefore cause a considerable reduction of the angle of departure from the correct conical shape.

It has been herein supposed (see Fig. 3) that B and B' have the correct cone-shape for $a^1$ and $a^6$ respectively, in order that the condition of rolling friction without slipping shall be perfectly realized both for the high and the slow speeds which are evidently the most to be considered. But this condition of correct conical shape could also be realized for the other steps, and especially for the intermediate steps $a^2$ and $a^5$ of each group, in which case the angle of departure from the correct conical shape will be of still smaller value should for instance the roller B be engaged, not now with $a^2$, but with $a^1$ or $a^3$, since it will now vary only by a single notch or degree, at a maximum, from the step having the "correct cone-shape".

It will be observed that the slow-speed roller B' which is out of action at the high speeds, will always be maintained in good working order and can therefore be relied upon for starting up under the best conditions. Any suitable mechanism can be employed for uncoupling, which will serve to separate the shafts by pivoting either one of the shafts, without departing from the principle of the invention.

The present speed-changing method possesses the following advantages:

1. Unsteadiness of the roller on the cone pulley is thereby avoided, to wit, the slipping and excessive overheating which have hitherto prevented friction gear from coming into practical use except for small power purposes.

2. The differential can now be actuated by a simple universal joint shaft, whereas the friction disk transmission gear requires the use of chains.

Having thus described the invention what is claimed is:

1. A change-speed device of the friction cone type, comprising in combination a shaft mounted in relatively stationary bearings, a second shaft having a pivotally mounted bearing whereby the shaft may be moved to and from the first shaft, means acting constantly to move the second shaft toward the first shaft, a plurality of multiple conical steps secured upon one of the shafts, and a plurality of conical rollers mounted on the other shaft and so disposed that each roller shall engage a group or only a portion of said steps, the rollers and steps being so related that only a single roller shall be engaged with the steps at any given time.

2. A change-speed device of the friction cone type, comprising in combination a shaft mounted in relatively stationary bearings, a second shaft having a pivotally mounted bearing whereby the shaft may be moved to and from the first shaft, means acting constantly to move the second shaft toward the first shaft, a series of multiple conical steps secured to one of the shafts and divided into sets, a plurality of conical rollers mounted on the other shaft, corresponding to the number of sets of multiple conical steps on the other shaft, and so disposed as to coöperate in each case with the corresponding set of said steps and to permit engagement of only a single roller at any given time.

3. A speed-changing system of the friction cone type, containing, in combination, upon one shaft a friction pulley containing two groups of steps of truncated cone shape and having different diameters, and upon the second shaft two rollers rotating with the said shaft and slidable longitudinally thereupon, together with means for engaging either one of the two rollers with any one of the steps of the corresponding group of steps, the relative position of the rollers and the steps being such that only a single roller shall be engaged at any given time.

4. A speed-changing system of the friction cone type, containing, in combination, upon one shaft a pulley containing two adjacent groups of steps of truncated cone shape, and upon a second shaft two rollers carried by a sleeve rotatable with the said shaft and slidable longitudinally thereupon, together with means for moving the two shafts toward or from each other for the purpose of coupling or uncoupling, and means for displacing the roller-carrying sleeve in order to engage one or the other roller with the desired step of the corresponding group of steps.

5. A change-speed device of the friction cone type comprising in combination a driving shaft mounted in relatively stationary bearings, a drum on said shaft having adjacent sets of truncated cone shaped steps, a driven shaft supported adjacent one end in a pivotally mounted bearing and having its other end mounted in a bearing movable toward and from the driving shaft, means acting to move the driven shaft toward the driving shaft, two rollers mounted on the driven shaft and movable longitudinally thereof, means for moving said rollers longitudinally of the shaft to bring one or the other thereof into engagement with the desired cone shaped step on the driving shaft, and a universal joint device for connecting the driven shaft with an element to be driven.

6. A change-speed device of the friction cone type, comprising in combination a driving shaft having thereon a plurality of conical steps, a driven shaft extending obliquely to the driving shaft, and having its end adjacent the axis of the driving shaft supported in a pivotally mounted bearing, a spring acting upon the other end of the driven shaft for moving said shaft about said pivot toward the driving shaft, two connected rollers mounted on the driven shaft and movable longitudinally thereof, means for moving the driven shaft away from the driving shaft, and means for moving the rollers longitudinally of the driven shaft to bring either thereof into engagement with the desired step on the driving shaft.

In testimony whereof, we have signed our names to this specification.

GASTON ROUDIL.
MARC DURAND.